United States Patent
Spanke et al.

(10) Patent No.: US 7,819,002 B2
(45) Date of Patent: Oct. 26, 2010

(54) FILLING LEVEL MEASUREMENT METHOD ACCORDING TO THE RUNNING TIME PRINCIPLE

(75) Inventors: Dietmar Spanke, Steinen (DE); Marc Baret, Kembs (FR); Edgar Schmitt, Friesenheim (DE); Yong Jin, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 408 days.

(21) Appl. No.: 10/583,354

(22) PCT Filed: Dec. 14, 2004

(86) PCT No.: PCT/EP2004/053462

§ 371 (c)(1),
(2), (4) Date: Jan. 31, 2007

(87) PCT Pub. No.: WO2005/062001

PCT Pub. Date: Jul. 7, 2005

(65) Prior Publication Data

US 2007/0214880 A1    Sep. 20, 2007

(30) Foreign Application Priority Data

Dec. 19, 2003   (DE) ................. 103 60 710

(51) Int. Cl.
*G01F 23/28* (2006.01)
(52) U.S. Cl. .................................. 73/290 V
(58) Field of Classification Search ............. 73/290 V; 324/124, 165, 195
See application file for complete search history.

(56) References Cited

U.S. PATENT DOCUMENTS

| 2,330,829 | A | * | 10/1943 | Lundberg et al. | ............ 250/255 |
| 4,901,245 | A | * | 2/1990 | Olson et al. | ................ 73/290 V |
| 5,062,295 | A | * | 11/1991 | Shakkottai et al. | ........ 73/290 V |
| 5,587,969 | A | * | 12/1996 | Kroemer et al. | ................ 367/99 |
| 6,536,275 | B1 | | 3/2003 | Durkee | |

(Continued)

FOREIGN PATENT DOCUMENTS

DE    42 33 324 C2    4/1994

(Continued)

OTHER PUBLICATIONS

Wikipedia-Polynomial interpolation http://en.wikipedia.org/wiki/Polynomial_interppolation.*

*Primary Examiner*—Hezron Williams
*Assistant Examiner*—Alex Devito
(74) *Attorney, Agent, or Firm*—Bacon & Thomas, PLLC

(57) ABSTRACT

A reliable method for measuring a fill level of a fill substance in a container using a fill level measuring device working according to the travel-time principle, wherein, periodically, transmission signals are sent in the direction of the fill substance, their echo signals are registered and converted into an echo function, at least one echo characteristic of the echo function is determined and, on the basis of the echo characteristics of at least one preceding measurement, a prediction is derived for the echo characteristics to be expected in the case of the current measurement, the echo characteristics of the current measurement are determined taking into consideration the prediction, and, on the basis of the echo characteristics, the current fill level is determined.

4 Claims, 2 Drawing Sheets

U.S. PATENT DOCUMENTS

2003/0011480 A1 * 1/2003 Fehrenkamp ............ 340/573.6

FOREIGN PATENT DOCUMENTS

| DE | 42 34 300 | A1 | 4/1994 |
| DE | 43 08 373 | C2 | 9/1994 |
| DE | 195 44 071 | A1 | 5/1997 |
| DE | 198 24 267 | A1 | 12/1999 |
| DE | 102 55 280 | A1 | 6/2004 |

* cited by examiner

FILLING LEVEL MEASUREMENT METHOD ACCORDING TO THE RUNNING TIME PRINCIPLE

FIELD OF THE INVENTION

The invention relates to a method for fill level measurement using the travel-time principle with contactlessly working, fill level measuring devices.

BACKGROUND OF THE INVENTION

Such contactless measuring devices are used in a number of branches of industry, e.g. in the processing, chemicals, and foods industries.

For fill level measurement, short transmission signals, e.g., microwaves or ultrasonic waves, are periodically sent to the surface of a fill substance by means of a transmitting and receiving element, followed by receipt of their echo signals reflected on the surface, after a distance-dependent travel-time. An echo function is formed representing the echo amplitudes As a function of travel-time. Each value of this echo function corresponds to the amplitude of an echo reflected at a certain distance from the antenna.

From the echo function, a wanted echo is determined which corresponds probably to the reflection of the transmitted signal on the surface of the fill substance. In such case, it is as a rule assumed that the wanted echo exhibits a greater amplitude than the remaining echoes. From the travel-time of the wanted echo, in the case of known propagation velocity of the transmission signals, the distance between the fill substance surface and the antenna directly results.

Usually it is not a received raw signal which is used for the evaluation, but, instead, its so called envelope curve. The envelope curve is produced by rectifying and filtering the raw signal. For exact determination of a travel-time of the wanted echo, first a maximum of the envelope curve is determined.

This conventional manner of proceeding operates faultlessly in a large number of applications. Problems do, however, arise always in those cases in which it is not possible to unequivocally identify the echo coming from the fill substance. This can, for example, be the case, when installed structures are present in the container and these installed structures reflect the transmission signals better than the fill substance surface.

In such cases, it is possible, e.g. at startup, to specify once for the fill level measuring device the current fill level. The fill level measuring device can identify the associated echo as wanted echo on the basis of the specified fill level and e.g. follow such by a suitable algorithm. In such case, e.g. in each measuring cycle, maxima of the echo signal or echo function are determined, and, on the basis of knowledge of the fill level determined in the previous measuring cycle and an application-specific maximally expected rate of change of the fill level, the wanted echo is determined. From the travel-time of the so determined current wanted echo, the new fill level is then determined.

Starting with the position of the wanted echo in the previous measuring cycle, a time window is determined in which the wanted echo of the current measuring cycle must be. The current wanted echo can, however, only then be found in this time window when the wanted echo of the previous measuring cycle could be determined and, in the current measuring cycle, a maximum corresponding to the current wanted echo can be found.

The travel-time of the maximum of the wanted echo is, however, an echo property which cannot always be determined. For instance, if the fill level is located in the vicinity of a fixedly installed disturbance, e.g. a holder in the interior of the container, then the echoes of the disturbance and the fill substance are superimposed. An identification of the wanted echo is then not always possible. Similar problems arise when elements extend into the signal path only sporadically, such as is the case e.g. with stirrers which suddenly emerge in the vicinity of the fill substance surface in the signal path and reflect the transmission signals, or when the reflection characteristics of the fill substance changes, e.g. due to foam formation on the surface.

SUMMARY OF THE INVENTION

It is an object of the invention to provide a method for measuring a fill level of a fill substance in a container with a fill level measuring device working according to the travel-time principle, which measuring device works reliably.

The invention achieves this object by a method for measuring a fill level of a fill substance in a container with a fill level measuring device working according to the travel-time principle, wherein transmission signals are periodically sent in the direction of the fill substance, their echo signals are registered and converted into an echo function, at least one echo characteristic of the echo function is determined, and on the basis of the echo characteristics of at least one previous measurement, a prediction is derived for echo characteristics expected in the case of the current measurement, the echo characteristics of the current measurement are determined taking into consideration the prediction, and, on the basis of the echo characteristics, the current fill level is determined.

According to a further development of the method, the echo characteristics are travel-times of maxima of the echo function, and a known reflector in the interior of the container, especially a fill substance surface, a floor of the container, or a fixedly installed disturbance, can be matched to the maxima.

According to a further development of the method, on the basis of the travel-time of at least one maximum of a previous measurement, a prediction is made for the travel-time to be expected for the corresponding maximum in the case of the current measurement.

According to an embodiment of the method, the prediction is made that the travel-times to be expected for the maxima are equal to the travel-times of the corresponding maxima of the immediately preceding measurement.

In another embodiment of the method, the predictions for the travel-times of the maxima are determined by calculating, on the basis of at least two preceding measurements, an instantaneous rate of change of travel-time, and the travel-time to be expected is extrapolated on the basis of this rate.

In a further embodiment of the method, the prediction for the travel-times of the maxima is determined by calculating an instantaneous acceleration and an instantaneous rate of change of travel-time on the basis of at least three preceding measurements and the travel-time to be expected is extrapolated on the basis of the acceleration and the rate of change.

In a further development of the method, an echo characteristic is the travel-time of the wanted echo reflected on the fill substance surface. On the basis of at least one previous measurement, the travel-time of the wanted echo reflected on the fill substance surface to be expected in the case of the current measurement is determined and that maximum of the current actual echo function is determined whose travel-time exhibits the smallest deviation from the predicted travel-time of the wanted echo reflected on the fill substance surface. On the basis of the travel-time of this maximum, the current fill level is determined.

In a further development of the method, an echo characteristic is the travel-time of the echo reflected on the floor of the container. On the basis of at least one previous measurement, the travel-time of the echo reflected on the floor of the container to be expected in the case of the current measurement is determined and that maximum of the current echo function is determined whose travel-time exhibits the smallest deviation from the predicted travel-time of the echo reflected on the floor of the container. Taking into consideration the travel-time of this maximum, the current fill level is determined.

In a further development of the last stated further development of the method, from the travel-time of the echo currently reflected on the floor, an estimated value is calculated for the travel-time of the current wanted echo. That maximum of the current echo function is determined whose travel-time exhibits the smallest deviation from the estimated value, and, on the basis of the travel-time of this maximum, the current fill level is determined.

In a further development, the measured results are continuously reviewed for their plausibility.

BRIEF DESCRIPTION OF THE DRAWINGS

The invention and further advantages will now be explained in greater detail on the basis of the figures of the drawing in which an example of an embodiment is presented; equal elements are provided in the figures with equal reference characters. The figures of the drawing show as follows.

DETAILED DESCRIPTION OF THE DRAWINGS

Figure 1:
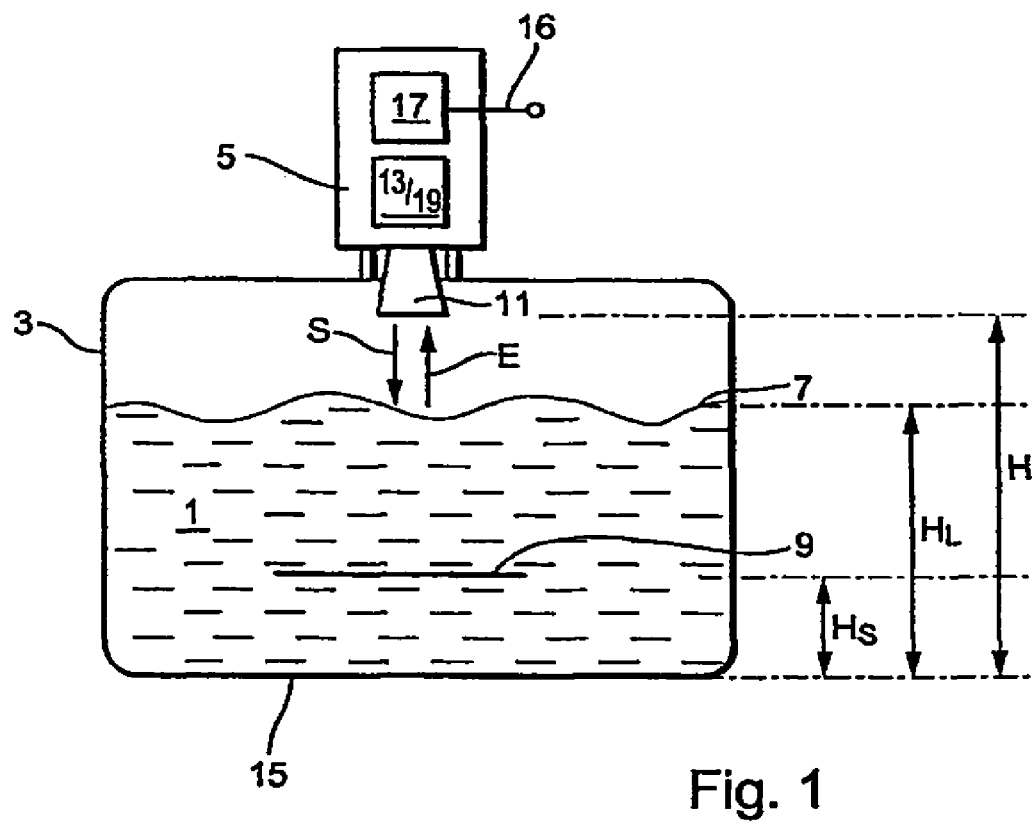
FIG. 1 an arrangement for fill level measurement with a fill level measuring device working according to the travel-time principle.

FIG. 1 shows an arrangement for fill level measurement. Shown is a container 3 filled with a fill substance 1. Arranged on the container 3 is a fill level measuring device 5 working according to the travel-time principle. Suitable as fill level measuring device 5 is e.g. a fill level measuring device working with microwaves or a fill level measuring device working with ultrasound. Fill level measuring device 5 serves to measure a fill level 7 of a fill substance 1 in the container. Shown in the container 3 by way of example is a disturbance 9. Disturbances 9 are e.g. fixedly installed structures in the container on which structures reflections can occur. Only a single disturbance 9 has been provided here in order to make the presentation easier to understand and to provide for a better overview. Naturally, in real measuring situations, very many more disturbances can be present.

The fill level measuring device 5 includes at least one sending and receiving element 11 for sending transmission signals S and for receiving echo signals E. In the illustrated example of an embodiment, a fill level measuring device working with microwaves is shown. The fill level measuring device includes a single antenna 11 acting as sending and receiving element 11. Thus, this antenna both sends and receives. Alternatively, however, one antenna can be provided for transmitting signals and at least one additional antenna for receiving. In the case of a fill level measuring device working with ultrasound, instead of the antenna, an ultrasonic sensor would be provided as the sending and receiving element. The ultrasonic sensor would include an electromechanical transducer, e.g. a piezoelectric element.

The transmission signals S are sent toward the fill substance 1 and are reflected on a fill substance surface 7, as well as also on the container 3 and on disturbances 9 present in the container 3. The superposition of these reflections forms the echo signal E.

In the case of fill level measurement according to the travel-time principle, transmission signals S, e.g. short microwave, or ultrasonic, pulses, are periodically sent in the direction of a fill substance 1. Their echo signals E of the transmission pulses S are registered and sent to a signal processing 13, which serves for deriving from the received echo signals E an echo function A(t), which contains the amplitudes A of the echo signals E as a function of their travel-time t.

Figure 2:
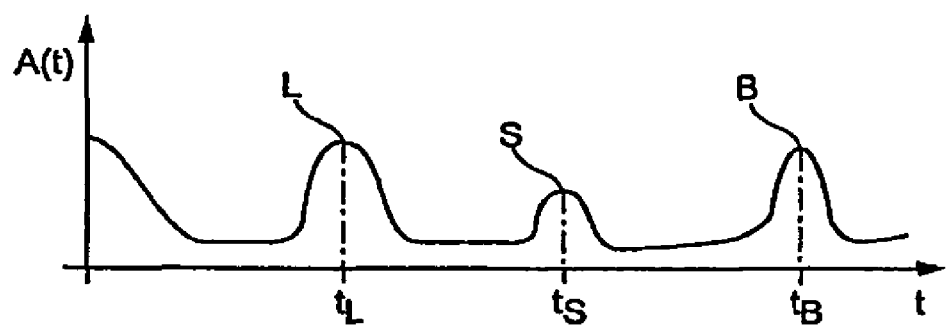
FIG. 2 an example of an echo function recorded with the arrangement illustrated in FIG. 1.

FIG. 2 is an example of such an echo function for the arrangement of FIG. 1. The echo function exhibits three marked maxima. These maxima are echoes L, D, F, of which the echo L is attributable to a reflection on the fill substance surface, echo D to a reflection on the disturbance 9 and echo F to a reflection on the floor 15 of the container 3. The echoes L, D, F occur at the travel-times $t_L$, $t_D$, $t_F$ corresponding to the distances between the sending and receiving element 11 and, respectively, the fill substance surface, the disturbance 9, and the floor 15.

In the method of the invention for measuring fill level of the fill substance 1 in the container 3, the fill level measuring device 5 working according to the travel-time principle periodically sends transmission signals S in the direction of the fill substance 1. Echo signals E of the transmission signals S are registered and converted into the echo function A(t).

Figure 3:
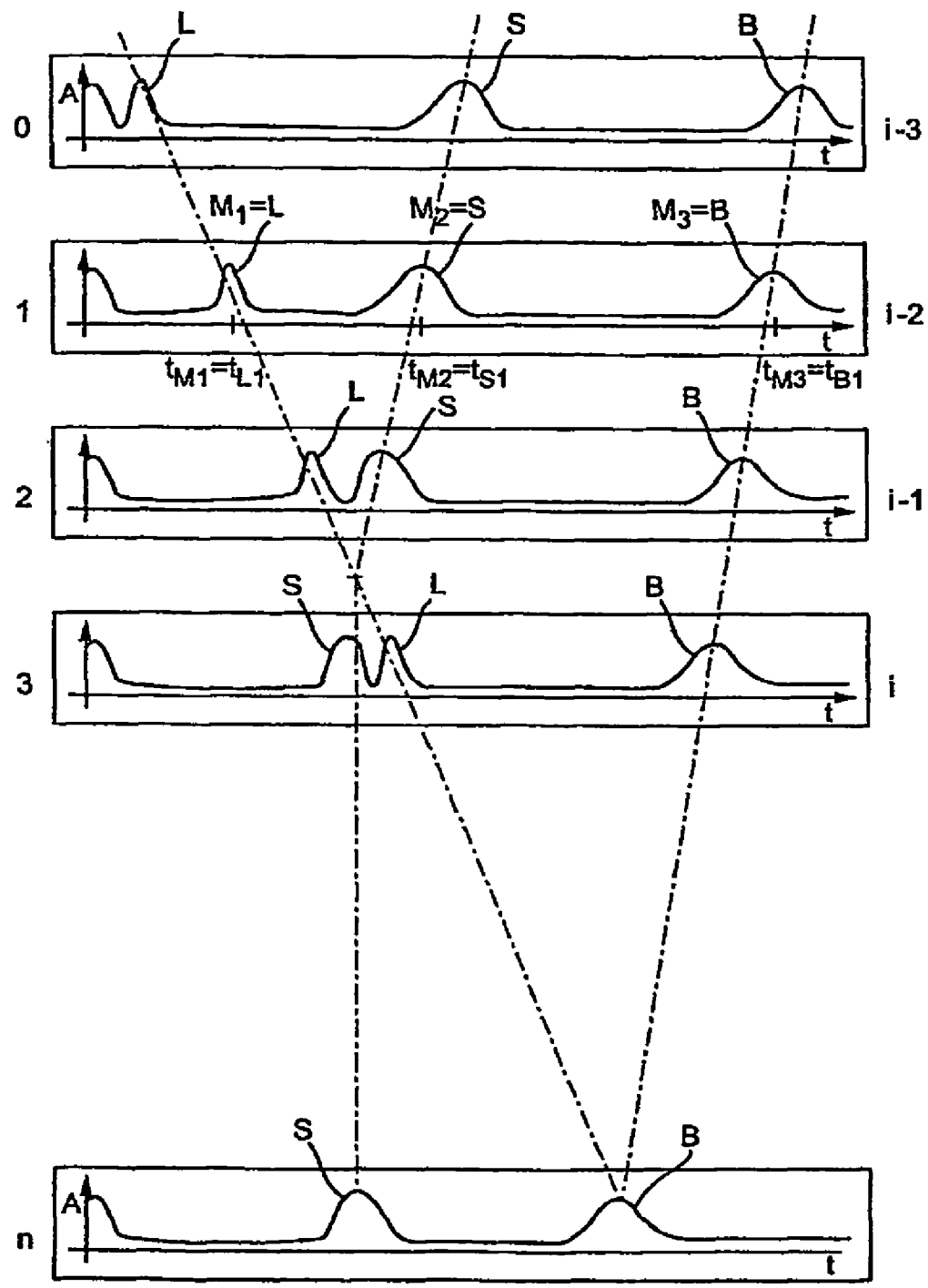
FIG. 3 an example for a time sequence of echo functions which occur when an originally full container steadily empties.

In FIG. 3, in the graphs 0 to n, an example of a time development of the echo functions A(t) is presented. The example represents a sequence which occurs when an originally full container 3 steadily empties. Graph 0 in such case corresponds to a full container 3 and graph n to an empty container 3.

According to the invention, in each measuring cycle at least one echo characteristic of the echo function A(t) is determined. The echo characteristics are preferably travel-times $t_L$, $t_D$, $t_F$, of maxima of the echo function A(t) to which maxima known reflectors in the interior of the container 3 can be matched, especially the fill substance surface, the floor 15 of the container 3 or a fixedly installed disturbance, such as e.g. the disturbance 9.

Besides the travel-time of an echo, also its amplitude, its shape, and its waveform provide other echo characteristics which can be applied within the framework of the method for associating an echo with a reflector.

In order that the echoes can be matched on the basis of the echo characteristics unequivocally to a certain reflector, in the case of startup of the fill level measuring device 5, the method includes an initializing. In such case, echo characteristics present at the initializing, here $t_{L0}$, $t_{D0}$, $t_{F0}$, are determined and stored in the fill level measuring device 5. The procedure is analogous in the case of other echo characteristics, e.g. amplitude, shape and/or waveform of the echo.

In the example shown in FIG. 3, graph 0 of the echo function A(t) is that which was recorded at the time of startup. The determining of the echo characteristics of the echo function A(t) recorded in the case of the initializing occurs, for example, by the specifying by a user of the fill level 7 present at startup, as well as the separation of the floor 15 of the container 3 from the sending and receiving element 11 and the separation of the disturbance 9 from the sending and receiving element 11 or from the floor 15.

The separation of the floor 15 of the container 3 from the sending and receiving element 11 and the separation of the disturbance 9 from the sending and receiving element 11 or from the floor 15 are as a rule known to the user and can be input, e.g. via a communications interface 16 or an onsite display (not shown) and stored in a memory 17.

The fill level, to the extent it is not known, for other reasons, at the time of startup, is determined, e.g. by sounding. Alternatively, the current fill level can also be determined by an above described, conventional fill level measurement using the fill level measuring device. In the case of this last method, preferably a high degree of certainty is to be demanded of the fill level measurement. In such case, the measured fill level is only, then, stored as the current fill level 7, when the associated, wanted echo has been unequivocally identified. An evaluation criterion for an unequivocal identification can be, for example, the amplitude of the wanted echo. If this exceeds a predetermined threshold value and if it is clearly greater than amplitudes of the echo function in the vicinity of the wanted echo, then it can be assumed that the correct echo was identified as the wanted echo. On the basis of the predetermined data, the echoes L, D, F of the echo function A(t) are unequivocally identified, and the travel-times $t_{L0}$, $t_{D0}$, $t_{F0}$ of the matching maxima are determined and stored.

The fill level 7 can naturally also be determined by other methods. Thus, for example, in the German patent application number 10260962.4 filed 20 Dec. 2002, a method is described, in which, by the registering of echo functions at different fill levels 7, a table is constructed, on the basis of which the echo coming from the fill substance 1 can be unequivocally identified.

Following this initializing, measuring operation can be started. The echo characteristics determined during the initializing are available for the first measurement as echo characteristics of the measurement immediately preceding the current measurement.

During measurement operation, a prediction for the echo characteristics to be expected in the case of the current measurement is derived on the basis of the echo characteristics of at least one previous measurement.

In such case, preferably a prediction on the basis of the travel-time of at least one maximum of a preceding measurement is made for the travel-time to be expected for the corresponding maximum in the case of the current measurement.

Correspondingly, in the case of echo characteristics such as e.g. amplitude, shape and/or waveform, on the basis of the corresponding data at least of one preceding measurement, a prediction is made for the echo characteristics to be expected in the case of the current measurement.

In the example shown in FIG. 3, in the case of the first measurement following the initializing on the basis of the travel-times $t_{L0}$, $t_{D0}$, $t_{F0}$ determined as echo characteristics at the time of the initializing, a prediction P is made for the travel-times $T_{L1}$, $T_{D1}$, $T_{F1}$ to be expected for the corresponding maxima in the case of the first measurement.

In the simplest case, the prediction P is that the travel-times $T_{L1}$, $T_{D1}$, $T_{F1}$ to be expected are equal to the travel-times of the corresponding maxima of the immediately preceding measurement.

$$P: T_{L1} := t_{L0}$$

$$T_{D1} := t_{D0}$$

$$T_{F1} := t_{F0}$$

In such case, the prediction P can rest, as here described, on the immediately preceding measurement. Alternatively, however, also a measurement lying further back can be used as the starting point. Likewise, it is possible to derive the prediction P from a plurality of preceding measurements. The prediction P for a travel-time $T_{Li}$, $T_{Di}$, $T_{Fi}$ to be expected can e.g. be set equal to an average value of the travel-times $t_L$, $t_D$, $t_F$ of the corresponding maxima of a plurality of preceding measurements.

If the echo characteristics of two measurements preceding the current measurement are present, then the prediction P for the travel-times $T_{Li}$, $T_{Di}$, $T_{Fi}$ of the maxima can be determined by calculating, on the basis of the last two preceding measurements for each travel-time $T_{Li}$, $T_{Di}$, $T_{Fi}$, an instantaneous rate of change $v(T_{Li})$, $v(T_{Di})$, $v(T_{Fi})$ of the travel-times $T_{Li}$, $T_{Di}$, $T_{Fi}$ and extrapolating the travel-times $T_{Li}$, $T_{Di}$, $T_{Fi}$ to be expected on the basis of these rates $v(T_{Li})$, $v(T_{Di})$, $v(T_{Fi})$.

This is explained in the following, by way of example, on the basis of the progression shown in FIG. 3.

If, from the initializing (graph 0), the travel-times $t_{L0}$, $t_{D0}$, $t_{F0}$ are known and the travel-times $t_{L1}$, $t_{D1}$, $t_{F1}$ are known from the first measurement (graph 1), then the current rates of change $v(T_{Li})$, $v(T_{Di})$, $v(T_{Fi})$ are given by $$v(T_{L2}) := \frac{t_{L1} - t_{L0}}{\Delta t}$$

$$v(T_{D2}) := \frac{t_{D1} - t_{D0}}{\Delta t}$$

$$v(T_{F2}) := \frac{t_{F1} - t_{F0}}{\Delta t}$$

wherein $\Delta t$ represents here a time interval between two measurements, in this case the initializing and first measurements.

The extrapolation then yields the following prediction P:

$$P: T_{L2} := t_{L1} + v(T_{L2}) \Delta t$$

$$T_{D2} := t_{D1} + v(T_{D2}) \Delta t$$

$$T_{F2} := t_{F1} + v(T_{F2}) \Delta t$$

wherein $\Delta t$ represents a time interval between two measurements, here the first measurement and the second measurement.

For the ith measurement there thus holds analogously:

$$V: T_{Li} := t_{L,i-1} + v(T_{Li}) \Delta t$$

$$T_{Di} := t_{D,i-1} + v(T_{Di}) \Delta t$$

$$T_{Fi} := t_{F,i-1} + v(T_{Fi}) \Delta t$$

where $\Delta t$ represents a time interval between two measurements, here the ith and the (i-1)th measurements.

For the current rates of change $v(T_{Li})$, $v(T_{Di})$, $v(T_{Fi})$, there holds analogously:

$$v(T_{Li}) := \frac{t_{L,i-1} - t_{L,i-2}}{\Delta t}$$

$$v(T_{Di}) := \frac{t_{D,i-1} - t_{D,i-2}}{\Delta t}$$

$$v(T_{Fi}) := \frac{t_{F,i-1} - t_{F,i-2}}{\Delta t}$$

Also, here, it holds, analogously, that the two measurements on which the prediction P rests need not necessarily immediately precede the current measurement. Also, the two preceding measurements need not immediately follow one after the other. It is sufficient when any two preceding measurements are present and a time interval lying between the two measurements is known.

If results of at least three preceding measurements exist, then the prediction P for travel-times, $T_{Li}$, $T_{Di}$, $T_{Fi}$, can be determined by calculating, on the basis of the last three preceding measurements, instantaneous accelerations $a(T_{Li})$, $a(T_{Di})$, $a(T_{Fi})$ and instantaneous rates of change $v(T_{Li})$, $v(T_{Di})$, $v(T_{Fi})$ of the travel-times and extrapolating the expected travel-times $T_{Li}$, $T_{Di}$, $T_{Fi}$ on the basis of the accelerations $a(T_{Li})$, $a(T_{Di})$, $a(T_{Fi})$ and the rates of change $v(T_{Li})$, $v(T_{Di})$, $v(T_{Fi})$.

In this way, the prediction P reads as follows:

$$P: T_{Li} := t_{L,i-1} + v(T_{Li})\Delta t + \tfrac{1}{2} a(T_{Li})(\Delta t)^2$$

$$T_{Di} := t_{D,i-1} + v(T_{Di})\Delta t + \tfrac{1}{2} a(T_{Di})(\Delta t)^2$$

$$T_{Fi} := t_{F,i-1} + v(T_{Fi})\Delta t + \tfrac{1}{2} a(T_{Fi})(\Delta t)^2$$

wherein for the current accelerations $a(T_{Li})$, $a(T_{Di})$, $a(T_{Fi})$ the following holds:

$$a(T_{Li}) := \frac{t_{L,i-1} - 2t_{L,i-2} + t_{L,i-3}}{(\Delta t)^2}$$

$$a(T_{Di}) := \frac{t_{D,i-1} - 2t_{D,i-2} + t_{D,i-3}}{(\Delta t)^2}$$

$$a(T_{Fi}) := \frac{t_{F,i-1} - 2t_{F,i-2} + t_{F,i-3}}{(\Delta t)^2}$$

Also here, it holds analogously that the three measurements on which the prediction P rests need not immediately precede the current measurement. Also, the three preceding measurements need not immediately follow one after the other. It suffices if any three preceding measurements are present and the time intervals lying between the measurements are known.

Attention is, however, to be paid in all the described cases, in the selection of the preceding measurements, that the length of time between the measurements and the current measurement is not too large. A measure for this is a time scale in which the travel-times, their rates of change, and their accelerations change.

In the case of the described examples of embodiments, up to three preceding measurements have been taken into consideration in making the prediction. It is, however, possible to take into consideration also more preceding measurements, in the deriving of the prediction.

Additionally, it is also possible to take into consideration for the calculation yet the rate of change of acceleration and models of higher order, when sufficient measurement data is available and the character of the fill level change requires such.

Finally, the echo characteristics of the current measurement i, here the travel-times $t_{Li}$, $t_{Di}$, $t_{Fi}$ are determined, taking into consideration the prediction P. For the presented example, for the first measurement this means that the maxima, here $M_1$, $M_2$ and $M_3$, and the associated travel-times, here $t_{M1}$, $t_{M2}$, and $t_{M3}$, of the echo function A(t) shown in graph 1 of FIG. 3 of the current measurement are determined. The travel-times are compared with the travel-times of the prediction. The comparison occurs, for example, by a difference formation, in that, for each expected travel-time $T_{Li}$, $T_{Di}$, $T_{Fi}$, the difference between each of the travel-times $t_{M1}$, $t_{M2}$, and $t_{M3}$ and the expected travel-times $T_{L1}$, $T_{D1}$, and $T_{F1}$ are calculated. For each expected travel-time $T_1$, $T_{D1}$, $T_{F1}$, that travel-time, $t_{M1}$, $t_{M2}$, or $t_{M3}$, is determined, for which the difference is minimal.

It is, however, also possible to use other algorithms suited for the comparison. If e.g. the shape of the echo is a relevant echo characteristic, then a shape comparison can occur e.g. by minimizing the sum of all squares of residuals (least squares method).

Instead of comparing each of the travel-times, $t_{M1}$, $t_{M2}$, and $t_{M3}$, with each of the expected travel-times, respectively, $T_{L1}$, $T_{D1}$ and $T_{F1}$, it is also possible to provide for each expected travel-time $T_{L1}$, $T_{D1}$, $T_{F1}$ a time window that includes the particular, expected travel-time $T_{L1}$, $T_{D1}$, $T_{F1}$. It is sufficient then to compare with the appropriate expected travel-times only those of the travel-times $t_{M1}$, $t_{M2}$, $t_{M3}$, which lie inside of the respective time windows.

In the presented example, the travel-time $t_{M1}$ exhibits the lowest difference from the travel-time $T_{L1}$ predicted for the wanted echo. If the size of the difference $T_{L1} - t_{M1}$ is smaller than a predetermined threshold value, then the associated maximum $M_1$ is recognized as the wanted echo L of the current measurement. Correspondingly the associated travel-time $t_{M1}$ is recognized as the travel-time $t_{L1}$ of the wanted echo L of the current measurement and is stored.

In the same manner, all further echo characteristics of the current measurement are determined. Correspondingly, the maximum $M_2$ is recognized as the echo D of the disturbance 9 and the maximum $M_3$ as the echo of the floor 15 and the associated travel-times $t_{M2}$ as travel-time $t_{D1}$, of the echo D of the disturbance 9 and $t_{M3}$ as the travel-time $t_{F1}$ of the echo F of the floor 15 for the current measurement.

Each subsequent measurement cycle is handled in analogous manner. In such case, the prediction P after the first measurement can be calculated on the basis of a preceding measurement and after the third measurement on the basis of three preceding measurements.

Alternatively to the described extrapolation algorithms, it is possible to use also other methods for extrapolation of the expected echo characteristics on the basis of the preceding determined data. Thus, for example, on the basis of the time development known from the preceding measurements, a function can be determined which approximates the relevant time behavior. The function can in such case be matched flexibly to the current conditions resulting from the history. The prediction P is determined on the basis of the function.

The fill level will now be determined on the basis of the echo characteristics. If it was possible, for example, to determine as echo characteristic in the ith measurement the travel-time $t_{Li}$ of the wanted echo L, then the height $H_L$ of the fill level 7 in the container 3 can be calculated on the basis of the following formula:

$$H_L(t_{Li}) = H - \tfrac{1}{2}(vt_{Li})$$

wherein

H is the distance between the sending and receiving element 11 and the floor of the container 3, $H_L$ is the height of the fill level 7, and v is the propagation velocity of the signals.

If it was possible additionally to determine the travel-time $t_{Fi}$ of the echo from the floor 15 of the container 3 as echo characteristic, then this echo characteristic can also be used for determining the height $H_L$ of the fill level 7. This can be calculated on the basis of the following formula:

$$H_L(t_{Fi}) := \frac{t_{Fi} v v_L - 2 v_L H}{2(v - v_L)}$$

wherein:

$t_{Fi}$ is the travel-time of the echo F coming from the floor 15 of the container 3 in the case of the current measurement, H is the distance between the sending and receiving element 11 and the floor of the container 3, $H_L$ is the height of the fill level 7, v is the propagation velocity of the signals in free space, and $v_L$ is the propagation velocity of the signals in the fill substance.

The propagation velocity $v_L$ of the signals in the fill substance, to the extent that it is not known on the basis of knowledge of the physical characteristics of the fill substance, can be calculated on the basis of a preceding measurement in the case of which the container 15 was at least partially filled and both the wanted echo L, as well as also the echo F coming from the floor 15 of the container 3, as well as their travel-times $t_L$ and $t_F$ could be identified, according to the following formula:

$$v_L := \frac{2H - vt_L}{t_F - t_L}$$

wherein:

$t_F$ is the travel-time of the echo F of a previous measurement coming from the floor 15 of the container 3, $t_L$ is the travel-time of the wanted echo L of a previous measurement, H is the distance between the sending and receiving element 11 and the floor of the container 3, v is the propagation velocity of the signals in free space, and $v_L$ is the propagation velocity of the signals in the fill substance.

To the extent that the propagation velocity $v_L$ of the signals in the fill substance 1 does not change, it is sufficient to calculate this just one time. In the illustrated example of an embodiment, this can be done, for example, directly on the basis of the echo characteristics determined in the initializing. On the basis of this, the propagation velocity $v_L$ is determined according to the above formula as:

$$v_L := \frac{2H - vt_{L0}}{t_{F0} - t_{L0}}$$

If changes in the propagation velocity $v_L$ can arise, then this quantity must be determined regularly. Such changes are to be expected when the physical characteristics, such as e.g. density, material or dielectric constant, of the fill substance 1 can change.

Additionally, the travel-time $t_{Di}$ of the disturbance 9 of the echo coming from the disturbance 9 can be determined as an echo characteristic. This echo characteristic is always suitable for determining the height $H_L$ of the fill level 7, when the fill level 7 lies above the disturbance 9. Whether this is the case can be determined on the basis of the height $H_L$ of the fill level 7 determined in the preceding measurement and a predetermined maximally possible rate of change $v_{max}$ of the fill level 7. The maximum possible rate of change $v_{max}$ of the fill level 7 is application-specific and must be specified either by the user in the framework of the initializing and stored in the fill level measuring device 5 or it must be determined.

If, for the preceding measurement, $$H_D < H_L - v_{max} \Delta t$$

wherein $H_D$ is the height of the disturbance 9 in the container 3, $H_L$ is the height of the fill level determined in the preceding measurement, $v_{max}$ is the predetermined maximum possible rate of change of the fill level 7, and $\Delta t$ stands for the time interval between the preceding measurement and the current measurement, then, on the basis of the travel-time $t_{D1}$ of the echo D coming from the disturbance 9 determined as echo characteristic of the current measurement, the height $H_L$ of the current level fill level 7 can be calculated according to the following relationship:

$$H_L(t_{Di}) = \frac{vv_L t_{Di} + 2vH_D - 2v_L H}{2(v - v_L)}$$

In the case of all other fill levels 7, in which the height $H_L$ of the fill level 7 is located between the disturbance 9 and the floor 15, the travel-time $t_D$ of the echo D produced by the disturbance 9 has a constant value and cannot be used for fill level determination. It is suitable, however, for reviewing measurement accuracy and the plausibility of the resulting measurements.

In the case of the method in its simplest form, only a single echo characteristic of the echo function is used. The characteristic is the travel-time $t_L$ of the wanted echo L, or the travel-time $t_F$ of the echo F coming from the floor 15. In each measurement cycle, on the basis of the corresponding echo characteristic of at least one preceding measurement, a prediction P is derived, in the above-described manner, for the echo characteristic to be expected in the case of the current measurement. Subsequently, the echo characteristic of the current measurement is determined taking into consideration the prediction P, and, on the basis of the echo characteristic as above explained, the current fill level is determined, in that, on the basis of at least one preceding measurement, the expected travel-time $T_{Li}$ of the wanted echo L reflected on the fill substance surface is determined, that maximum of the current echo function is determined whose travel-time shows the smallest deviation from the predicted travel-time of the wanted echo reflected on the fill substance surface, and, on the basis of the travel-time of this maximum, the current fill level is determined as above explained.

If the echo characteristic of the current measurement cannot be determined, e.g. because a stirrer protrudes temporarily into the signal path, then the prediction P can be set in place of the current echo characteristic. The current fill level is then set equal to the fill level 7 resulting from the prediction P. For the subsequent measurement, the prediction P enters in the place of the echo characteristic known from the preceding measurement.

If the echo characteristic in a predetermined number of sequentially following measurements cannot be determined, then preferably an alarm is triggered and the method is restarted, with the above described initializing being carried out again.

Preferably in the case of the method of the invention, at least one additional echo characteristic of the echo function is used. For example, the echo characteristics, travel-time $t_L$ of the wanted echo L and travel-time $t_F$ of the echo F coming from the floor 15, can be used. In each measuring cycle, on the basis of the corresponding echo characteristics of at least one preceding measurement, a prediction P for the echo characteristics to be expected in the case of the current measurement is derived in the above-described manner, then the echo characteristics of the current measurement are determined, making use of the prediction P. In this case, on the basis of each of the considered echo characteristics, the current fill level can be determined in the manner as explained above.

The current fill level can selectively be set equal to the fill level determined on the basis of the echo characteristic travel-time $t_L$ of the wanted echo L or the travel-time $t_F$ of the echo F coming from the floor 15.

If both echo characteristics can be determined, then it can be set, which echo characteristic should be given preference for determining the fill level 7. The selection can also be made as a function of the level of the current fill level 7.

If one of the echo characteristics of the current measurement cannot be determined, then the fill level 7 is determined on the basis of the remaining determinable echo characteristics. The current fill level is equal to the fill level 7 resulting from the determined echo characteristics.

For the measurement following this current measurement, the results of the prediction P enter in the place of the nondetermined echo characteristics. For the following measurement, they are inserted as the echo characteristic known from the preceding measurement.

If, for example, in the case of a current measurement I, only the travel-time $t_{Fi}$ of the echo F coming from the floor 15 can be determined as the echo characteristic of the current measurement, in that the expected travel-time $T_{Fi}$ of the echo reflected from the floor 15 of the container 3 is determined on the basis of at least one preceding measurement and that maximum of the current echo function is determined whose travel-time has the least deviation from the predicted travel-time $T_{Fi}$ of the echo reflected from the floor 15 of the container 3, then the current fill level 7 is determined taking into consideration the travel-time $t_{Fi}$ of this maximum This can be done immediately, using the above provided formula for calculating the height $H_L$ of the fill level 7 as a function of the travel-time $t_{Fi}$.

Further, on the basis of the travel-time $t_{Fi}$ of the current echo F reflected on the floor 15, an estimated value $T_{LX}(t_{Fi})$ can be calculated for the travel-time of the current wanted echo L.

The estimated value $T_{LX}(t_{Fi})$ corresponds to that travel-time of the wanted echo which is to be expected in the case of the height $H_L$ determined on the basis of the travel-time $t_{Fi}$ of the current echo F reflected on the floor 15:

$$T_{LX}(t_{Fi}) = \frac{H - H_L(t_{Fi})}{v}$$

This estimated value $T_{LX}(t_{Fi})$ enters in the place of the prediction P for the travel-time $T_{Li}$ to be expected for the wanted echo L. That maximum of the current echo function is selected, whose travel-time has the least deviation from the estimated value $T_{LX}(t_{Fi})$ and the current fill level is determined on the basis of the travel-time of this maximum.

If none of the echo characteristics of the current measurement can be determined, e.g. because the sending and receiving element 11 is temporarily covered, then the prediction P can be set in place of the current echo characteristics. The current fill level is set equal to the fill level 7 resulting from the prediction P. For the subsequent measurement, the prediction P enters in the place of the echo characteristics known from the preceding measurement.

If none of the echo characteristics in a predetermined number of measurements following one on the other can be determined, then preferably an alarm is triggered and the method is started anew, with the above described initializing to be reexecuted.

Preferably, the measurement results are examined continuously for their plausibility. Suitable for the plausibility check is, especially, the comparison of the heights $H_L$ of the fill level $H_L(t_{Li})$, $H_L(t_{Fi})$ determined as a function of the various echo characteristics. If the fill level 7 lies above the disturbance 9, also the height $H_L(t_{Di})$ as a function of the travel-time $t_{Di}$ of the echo D coming from the disturbance 9 can be made use of. If the fill level 7 lies below the disturbance 9, the travel-time $t_{Di}$ can be reviewed as to correctness on the basis of the data gathered in the initializing. From this results a control possibility for checking the accuracy of the measurement. Likewise, a plausibility check can be done. If the travel-time $t_{Di}$ of the echo D coming from the disturbance 9 in the case of the current measurement shows that the disturbance 9 is not covered by the fill substance 1, then the height $H_L$ of the fill level 7 must lie beneath the installed height $H_D$ of the disturbance 9. If this is not the case, then, e.g. a malfunction report and/or an alarm can be issued as the result of this plausibility check.

In International Patent Application No. WO/EP02/08368, which was filed by the assignee on Jul. 26, 2002, a large number of physical relationships are described which can arise in the case of fill level measurement. It is presented there, how fill level can be determined on the basis of knowledge of these relationships. These relationships, as well as the fill level determinations derived therefrom, can be used, here, in the described method of the invention for plausibility checking.

As required, selected echo characteristics can be supplemented, replaced or eliminated.

The described method can be used as an independent measuring method or it can be used also in parallel with a conventional measuring method.

It enables an increased reliability of measurement, since the fill level 7 is determined not only on the basis of the current measurement, but also its past behavior is considered. This form of echo analysis delivers also then yet more reliable measuring results, when the wanted echo cannot be found for a short time. Reliable measurements are also still possible on the basis of the method, when, for a short time, elements, e.g. stirrers, protrude into the signal path or circumstances arise which lead to a worsening of the echo quality, e.g. a low signal to noise ratio.

The invention claimed is:

1. A method for measuring a fill level of a fill substance in a container using a fill level measuring device operating according to a travel-time principle, comprising the steps of:

sending periodic transmission signals toward the fill substance;

registering and converting their echo signals into an echo function; and determining at least one echo characteristic of the echo function, and, on the basis of echo characteristics of at least one preceding measurement, a prediction is derived for echo characteristics to be expected in the case of a current measurement, the echo characteristics include travel-time of maxima of the echo function, especially a maxima of fill substance surface, a maxima of a floor of the container or maxima of a fixedly installed disturbance on the basis of travel-time of at least one maximum of a previous measurement, a prediction is made for travel-time of a corresponding maximum to be expected in the case of the current measurement, wherein:

the prediction is made for travel-time of the maxima by calculating an instantaneous acceleration and an instantaneous rate of change of the travel-time on the basis of at least three preceding measurements, and the travel-time to be expected is extrapolated on the basis of the acceleration and the rate of change;

echo characteristics of the current measurement are determined, taking into consideration the prediction; and on the basis of the echo characteristics, the current fill level is determined.

2. The method as claimed in claim 1 wherein:

an echo characteristic is a travel-time of a wanted echo reflected on the fill substance surface;

a predicted travel-time to be expected for the wanted echo reflected on the fill substance surface in the case of a current measurement is ascertained on the basis of at least one preceding measurement;

that maximum of an echo function for the current measurement is selected whose travel-time has a smallest deviation from the predicted travel-time of the wanted echo reflected on the fill substance surface; and, taking into consideration the travel-time of this maximum, the current fill level is ascertained.

3. The method as claimed in claim 1, wherein:

an echo characteristic is a travel-time of an echo reflected on the floor of the container;

a predicted travel-time or an estimated value for the travel-time to be expected for the echo reflected on the floor of the container in the case of a current measurement is ascertained on the basis of at least one preceding measurement;

that maximum of an echo function for the current measurement is selected whose travel-time has a smallest deviation from the predicted travel-time of the echo reflected on floor of the container; and, taking into consideration the travel-time or the estimated value for the travel-time of this maximum, the current fill level is ascertained.

4. The method for measuring a fill level of a fill substance in a container as claimed in claim 1, wherein:

the measured results are continually reviewed for their plausibility.

* * * * *